United States Patent
Obara et al.

(10) Patent No.: US 6,759,003 B1
(45) Date of Patent: Jul. 6, 2004

(54) BLOW MOLDING METHOD, BLOW MOLDED PRODUCT AND BLOW MOLDING MOLD

(75) Inventors: Tomoyuki Obara, Ichihara (JP); Katsuhiko Tada, Ichihara (JP); Sueki Sugawara, Ichihara (JP); Shoichi Miura, Kariya (JP); Hirofumi Yamada, Kariya (JP); Shigekazu Kumazaki, Kariya (JP)

(73) Assignees: Idemitsu Petrochemical Co., Ltd., Tokyo (JP); Toyota Shatai Kabushiki Kaisya, Aichi-ken (JP)

( * ) Notice: Subject to any disclaimer, the term of this patent is extended or adjusted under 35 U.S.C. 154(b) by 534 days.

(21) Appl. No.: 09/763,552

(22) PCT Filed: Jun. 22, 2000

(86) PCT No.: PCT/JP00/04104
§ 371 (c)(1),
(2), (4) Date: Feb. 21, 2001

(87) PCT Pub. No.: WO00/78527
PCT Pub. Date: Dec. 28, 2000

(30) Foreign Application Priority Data

Jun. 24, 1999 (JP) .......................................... 11-178221

(51) Int. Cl.⁷ .............................................. B29C 49/04
(52) U.S. Cl. ....................... 264/529; 264/540; 425/531; 425/532; 425/545; 215/371; 220/604
(58) Field of Search ................................ 264/529, 540; 425/531, 532, 545; 215/371; 220/604

(56) References Cited

U.S. PATENT DOCUMENTS

| | | | | |
|---|---|---|---|---|
| 3,084,382 A | * | 4/1963 | Stuchbery ................... | 264/539 |
| 3,329,996 A | * | 7/1967 | Marcus et al. ............... | 425/532 |
| 3,736,201 A | * | 5/1973 | Teraoka ....................... | 156/145 |
| 5,346,666 A | * | 9/1994 | Kanoh et al. ................ | 264/521 |

FOREIGN PATENT DOCUMENTS

| | | |
|---|---|---|
| JP | 06-055423 | 3/1994 |
| JP | 06-210707 | 8/1994 |
| JP | 6-328549 | 11/1994 |
| JP | 7-108534 | 4/1995 |
| JP | 07-214649 | 8/1995 |
| JP | 08-066958 | 3/1996 |
| JP | 8-119043 | 5/1996 |
| JP | 10-138324 | 5/1998 |
| JP | 3012837 | 12/1999 |

* cited by examiner

*Primary Examiner*—Suzanne E. McDowell
(74) *Attorney, Agent, or Firm*—Flynn, Thiel, Boutell & Tanis, P.C.

(57) ABSTRACT

Blow-molding molds 10 and 20 having parison shutters 31 and 32 for preventing an inflation of the parison 3 toward the outside of the molds 10 and 20 are used in a blow-molding method of the present invention. In other words, a closed space for preventing the parison 3 from inflating out of the molds 10 and 20 are formed by the parison shutters 31 and 32 and a predetermined air is secured in the parison 3 in a frame clamping step (B). In the subsequent mold clamping step (C), the pressure inside the parison 3 starts to be increased when the molds 10 and 20 press the parison 3, so that the parison 3 can be continuously in contact with the die design surface 11. Accordingly, since the parison 3 can be uniformly contracted by cooling, molding failure such as streaks and uneven pattern transfer can be avoided, thus obtaining a blow-molded product having good appearance.

8 Claims, 5 Drawing Sheets

F I G. 3
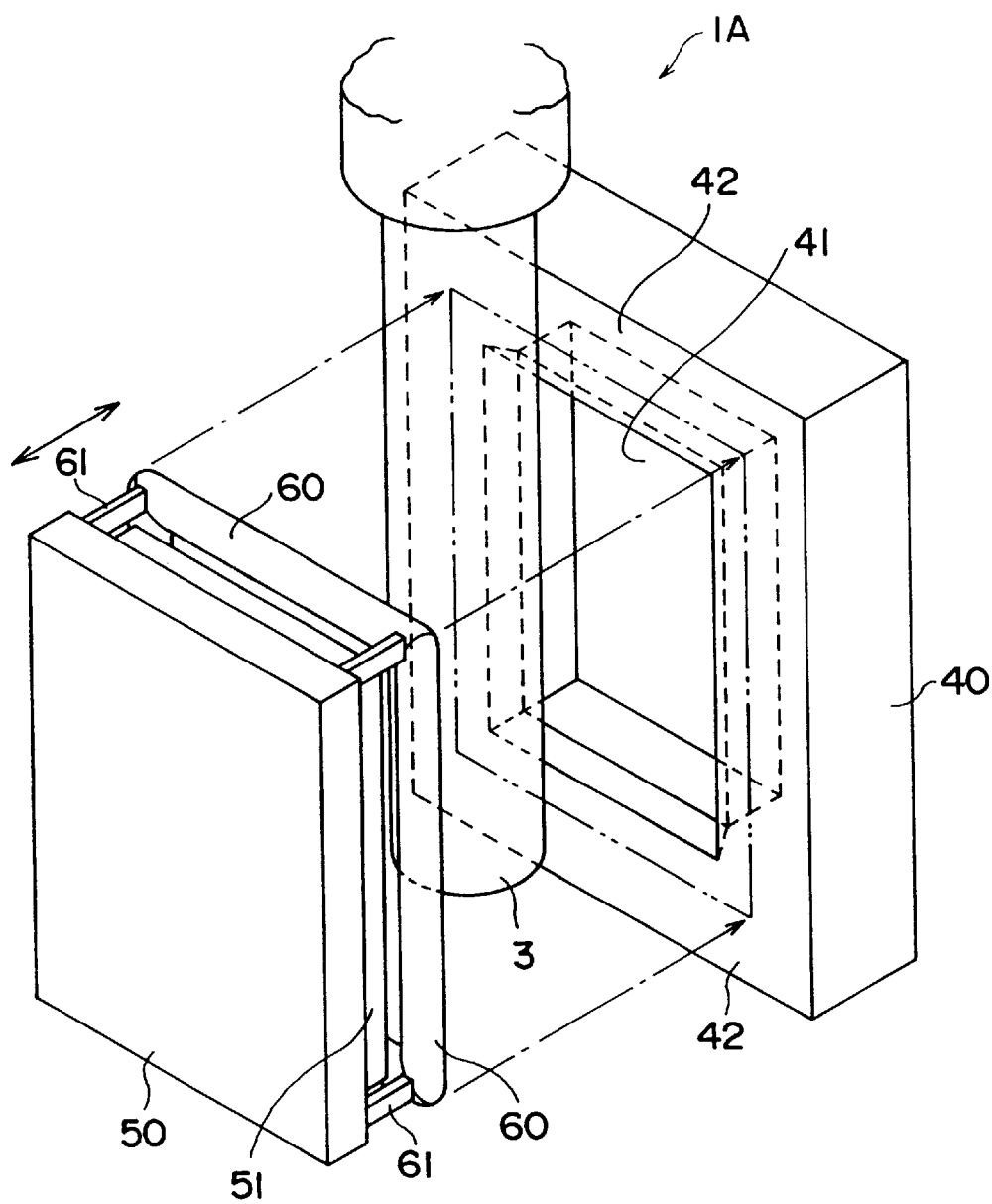

F I G. 4
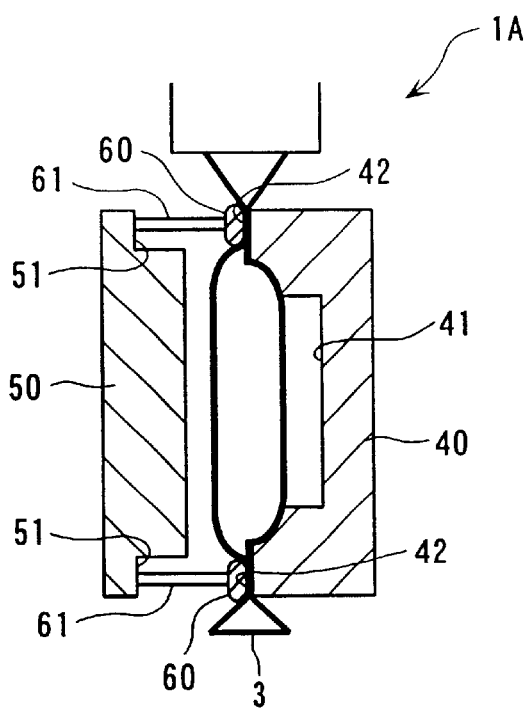
F I G. 5
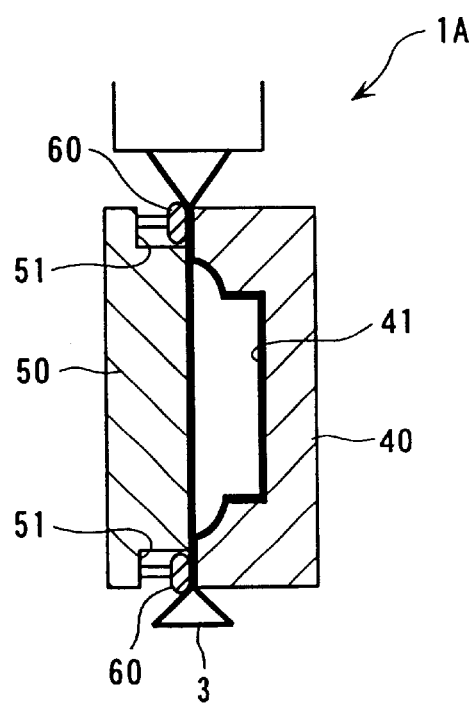

BLOW MOLDING METHOD, BLOW MOLDED PRODUCT AND BLOW MOLDING MOLD

TECHNICAL FIELD

The present invention relates to a blow-molding method for molding a molding product by introducing a parison extruded from a die into a mold and clamping the parison, a blow-molded product obtained by the blow-molding method and a blow-molding mold used for the blow-molding method.

BACKGROUND

Conventionally, resin-made container such as a bottle or a tank has been molded by a blow-molding method where a gas is blown into an inside of a parison introduced in a mold to render shape thereof.

In the blow-molding process, cylindrical parison is generally prepared by extruding molten resin from a die and the parison is sandwiched by a mold (split die) to render shape.

Thus molded blow-molded product weighs light because of hollow construction and is superior in shock resistance and soundproofness. Further, the blow-molding can be conducted by a low pressure so that production cost can be reduced and the containers etc. manufactured by the blow-molding often has simple structure, so that the molding die can be inexpensively made because of the simple structure of the mold.

In view of the above advantages, in recent years, blow-molded product has been widely used in various industrial fields such as automobile components, housing facilities and building materials.

For instance, bumpers and spoilers in the automobile field, door panel and components attached to bath units and lavatory units in the housing facilities field, and table top and various panels in the building materials in the building material field can be cited as a typical example.

The blow-molded product is manufactured by the blow-molding generally after following four steps as shown in FIG. 6.

(a)

During a parison injection step, a cylindrical parison 99 is extruded from a mold 90 of a blow-molding machine to be introduced between a first mold 91 and a second mold 92 as the blow-molding molds.

Incidentally, a die design surface 91A is formed on the first mold 91, the die design surface 91A having a pre-contact portion 93 as a convex portion protruding toward the parison 99 and a molding portion (blow-up portion) 94 as a deeply carved concave portion.

(b)

During a mold clamping step, the first mold 91 and the second mold 92 are closed to pinch the parison 99 by land portions 91B and 92B (burr portions) located on a periphery of the blow-molding molds 91 and 92. At this time, a space between the molds 91 and 92 is an open space opening toward the outside before the molds 91 and 92 are closed. Accordingly, since a part of the parison 99 inflates toward outside of the molds 91 and 92 when the molds 91 and 92 are closed, though the parison 99 touches the pre-contact portion 93, the parison 99 does not touch the whole of the molding portion 94.

(c)

Air is blown into the parison 99 from a pin 95 during an air blowing step, so that the parison 99 touches the whole of the molding portion 94.

(d)

Subsequently, the parison 99 is cooled and solidified to obtain the blow-molded products.

The Applicant of the present application has studied and found that the appearance of the blow-molded product is impaired by streaks and wrinkles on borders of respective portions of parison in contact with the pre-contact portion 93 and the molding portion 94 and uneven transfer of grain pattern. Specifically, after touching the pre-contact portion 93 during the mold clamping step as shown in FIG. 6(b), the parison 99 touches the molding portion 94 of the first mold 91 during the air blowing step as shown FIG. 6(c). Thus, the movement of the contact portion of the parison 99 to be in contact with the die design surface becomes stagnant between the part of the parison 99 to be in contact with the pre-contact portion 93 and another part of the parison 99 to be in contact with the molding portion 94. The above-described streaks and wrinkles are generated and grain pattern was transferred uneven on account of the stagnation of the contact portion.

Conventionally, even when the streaks and wrinkles were generated on the surface of the blow-molded product, the surface was painted to hide the streaks and wrinkles or, alternatively, the grain pattern was used on the surface design to make the streaks and wrinkles less prominent.

However, since cost reduction, recycling, and solvent regulation have been required for the blow-molded products, non-coating and specular appearance have been desired.

Accordingly, various techniques has been proposed for improving appearance design not generating the streaks, wrinkles and uneven pattern transfer and for enhancing transferability to enable decoration with minute complicated patterns to achieve non-coating and mirror-finished appearance.

For instance, a molding die having a heat insulator on a mold body and a space at the back of the die design surface for introducing and discharging heated gas or cooled liquid (Japanese Patent Application Laid-Open Publication No. Hei 07-108534) and a blow-molding method where a parison is forced against a die design surface of a mold covered with a heat insulation layer by a blow gas, the method using a mold capable of accurately transferring the die design surface while keeping the parison at a high temperature (Japanese Patent Application Laid-Open Publication No. Hei 06-328549) have been proposed.

Further, a non-coating molding product having glossy smooth surface made of a thermoplastic resin having specific melt index and flexure modulus of elasticity (Japanese Patent Application Laid-Open Publication No. Hei 08-119043) and a molding product made of polypropylene having high surface glossiness (Japanese Patent Application Laid-Open Publication No. Hei 10-138324) have also been proposed as example of modifying the material of the blow-molded product.

In such technique, the streaks and wrinkles or the uneven transfer on the molding product are prevented by modifying basic molding condition such as a timing for clamping the mold or blowing the air, by controlling the mold temperature during heating and cooling, or by providing vent port or porous electroform to efficiently discharge the gas inside the mold.

However, in a multi-layer blow-molding for not coating the molding product, when a transparent material is used as a surface layer of the molding product, the streaks and wrinkles are prominently generated on the molding product even when the blow-molding mold is heated to a high temperature or when the gas inside the die is efficiently discharged.

Further, when the manufacture thereof cannot be conducted at so high temperature for the convenience of molding cycle, it is found that the above techniques cannot be used for manufacturing a molding product requiring graining for applying pattern of imitation leather or texture.

This is because, though the mold temperature generally is preferably as high as possible for applying flowability to the parison, the molding cycle can be too lengthened since much time is required for raising and cooling the mold temperature when the mold temperature is set so high, so that the productivity can be lowered as a result.

Accordingly, a blow-molding method capable of obtaining molding product having good appearance without streaks, wrinkles and uneven pattern transfer without relying on mold temperature control has been desired.

DISCLOSURE OF THE INVENTION

An object of the present invention is to provide a blow-molded product having good appearance, a blow-molding method for producing the molding product and a blow-molding mold therefor.

A blow-molding method according to the present invention is for molding a molding product by introducing a parison extruded from a die into a mold, the method being characterized in having the steps of: providing the mold with a parison shutter for shutting the parison to keep the parison from inflating out of the mold; opening the mold; introducing the parison into the mold; shutting the parison by the parison shutter without bringing the parison into contact with the inner surface of the mold; and closing the mold to compress the parison to bring the parison into contact with the inner surface of the mold.

In other words, a predetermined pressure difference is secured between the inside and the outside of the parison in shutting the parison by the parison shutter, so that the tension of the parison can be maintained only by the air existed in the parison at the time shutting the parison, thereby bringing the parison into contact with the whole inner surface of the mold in accordance with closing the mold.

The inner surface of the mold refers mainly to die design surface. The die design surface includes flat inner surface of the mold as well as the inner mold surface having grain pattern or complicated irregularities. The inner surface of the die corresponding to the surface seen from the outside when ejected as a molding product is usually called the die design surface.

In the present invention, the parison extruded from the die in cylindrical shape into the mold is enclosed in the space surrounded by the die design surface and the parison shutter without being inflated toward the outside of the mold by the parison shutter provided to the mold. Further, since the parison is shut by the parison shutter, the air inside the parison lost when the parison is inflated out of the mold is kept in the enclosed parison. Accordingly, the air sufficient for the parison to touch the die design surface, i.e. the air sufficient for bringing the parison into contact with the die design surface only by the air pressure inside the parison, is filled inside the parison when the mold is clamped.

Subsequently, when the mold is clamped in the condition, the parison is pressed by the mold to raise the air pressure inside the parison. Accordingly, the parison continuously touches the die design surface. In other words, the whole parison touched the mold continuously and sequentially without stagnation, the streaks, wrinkles and uneven pattern transfer are not generated on the surface of the molding product. Accordingly, a molding product having beautiful gloss and clear transparency can be obtained.

Incidentally, another blow-molding technique for sealing much gas such as air in the parison in advance (Japanese Patent Publication No. Hei 06-55423, Japanese Patent Laid-Open Publication No. Hei 07-214649) has been proposed. However, in such technique, the surface of the parison and the inner surface of the mold are brought into contact in clamping the mold by the much amount of gas sealed in beforehand. Accordingly, the parison can be excessively inflated to be fat, so that the parison can go beyond the mold or explode in accordance with clamping the mold. In the present invention, since no excessive gas is sealed in clamping the mold, the above problem can be avoided.

Further technique using a frame like the parison shutter of the present invention (Japanese Patent Number 3012837) has also been proposed. However, since the parison is not shut (sealed) in the technique, a pressing effect toward the inner surface of the mold by the inner pressure of the gas is difficult to be obtained and improvement in moldability as in the present invention cannot be obtained. Further, a part of the parison is likely to stick out.

In the method of the present invention, the step of pre-blowing for blowing air into the parison before shutting the parison by the parison shutter may preferably be provided.

In the present invention, the force for abutting (pressing) the parison onto the mold is generated by the difference between the pressure of the air (gas) in the parison in clamping the mold (internal pressure of the parison) and the pressure of the air (gas) in the space between the parison and the mold. When the parison is kept, i.e., enclosed, in the closed space by the parison shutter, since the internal pressure of the parison can be adjusted by adjusting the air amount in the parison, the internal pressure of the parison, i.e. the force for bringing the parison into contact with the die design surface can be increased by increasing the air amount inside the parison by conducting pre-blowing before shutting the parison, so that the parison can be smoothly into contact with all of the die design surface in clamping the mold even when the die design surface has complicated configuration.

At this time, the air feeder for conducting the pre-blowing may be projected from any direction relative to the parison, however, the air feeder may preferably projected from the side or vertical direction of the parison.

In the present invention, when the parison is shut by the parison shutter, a space surrounded by an outer surface of the parison and an inner surface of the mold may preferably be arranged as a closed space and the mold may preferably be closed after decompressing the closed space (for instance, below the atmospheric pressure, and negative pressure relative to the pressure inside the parison).

Specifically, since the parison shutter shuts the parison, the closed space having no air circulation with the outside is formed in the area surrounded by the outer surface of the parison and the die design surface. And, for instance, by creating negative pressure by, for instance, discharging the air (any gas) enclosed in the closed space, the pressure difference between the inside of the parison and the closed space can be increased. As a result, the force for contacting (forcing) the parison against the die design surface is generated. Accordingly, since the pressure difference between the air pressure inside the parison and the air pressure within the closed space can be increased as compared with a case where only the parison shutter is used and the closed space is not arranged in negative pressure, the parison can securely touch the die design surface in clamping the die without pre-blowing, so that a molding product having further improved appearance can be obtained.

Further, by combining the pre-blowing and the negative pressure, the pressure difference between the air pressure inside the parison and the air pressure in the closed space can be further increased. In this case, the parison can be in contact with the die design surface even with the die design surface with more complicated configuration.

Since a blow-molded product obtained by the production method of the present invention shows superior appearance without streaks and wrinkles even by transparently coating or not coating the surface after ejecting the parison from the inside of the mold, troublesome work for color painting can be omitted.

A blow-molded product according to the present invention is characterized by being molded by the respective blow-molding methods.

Specifically, a blow-molded product according to the present invention is a molding product molded by introducing a parison extruded from a die into a mold, the mold being providing with a parison shutter for shutting the parison to keep the parison from inflating out of the mold, the molding product being produced by: opening the mold; introducing the parison into the mold; shutting the parison by the parison shutter without bringing the parison into contact with the inner surface of the mold; and closing the mold to compress the parison to bring the parison into contact with the inner surface of the mold.

In the blow-molded product of the present invention, the parison as a pre-solidified member of the molding product is shut by the parison shutter in advance to clamping the mold between the opposing molds without being inflated out of the mold. Accordingly, in the subsequent mold clamping step, the parison touches the design surface continuously from the convex portion (pre-contact portion) to the concave portion (blow-up portion). In other words, molding failure caused when a part of the parison goes beyond the mold and the air pressure inside the parison is decreased so that the parison does not touch the die design surface can be avoided, thereby securely and rapidly bringing the parison into contact with the die design surface. Accordingly, the parison can be uniformly contracted in cooling after the contact, thus avoiding molding failure such as streaks, wrinkles and uneven pattern transfer to obtain a blow-molded product having a surface with beautiful gloss and clear transparency.

A blow-molding mold according to the present invention is for accommodating and blow-molding a parison extruded from a die, the mold being characterized in having a parison shutter for shutting the parison extruded from the die to keep the parison from inflating out of the mold.

In the present invention, the parison cylindrically extruded from the die into the mold is shut by the parison shutter provided to the mold before clamping the mold without inflating toward the outside of the mold while being accommodated within a space surrounded by the die design surface and the parison shutter.

When the mold is clamped in the above condition, the parison initially touches the convex portion (pre-contact portion) projecting toward the parison and is pressed, so that the air pressure inside the parison is raised. Accordingly, after the parison touches the convex portion, the parison continuously touches the concave portion of deeply carved mold (blow-up portion) without intermission. In other words, since the parison continuously touches the mold without stagnation and the whole parison is uniformly cooled, the streaks, wrinkles and uneven pattern transfer are not generated on the surface of the molding product. Accordingly a molding product having beautiful gloss and clear transparency can be obtained.

The parison shutter of the present invention may preferably include a frame body respectively provided around a periphery of opposing molds and advanceable and retractable from one mold to the other mold, the frame body being abutted to shut the parison within a closed space isolated from an outside of the mold by the frame body and the mold.

In the above arrangement of the present invention, since the parison shutter for shutting the parison is provided around the mold, in other words, since the space formed by the parison shutter and the mold has no gap for allowing the parison to inflate out of the mold, the enclosed parison can be securely accommodated between the opposing molds. Accordingly, the inflation toward the outside of the mold in clamping the mold can be securely restrained, so that the parison can securely touch the die design surface.

At this time, the movement of the frame body for shutting the parison is simple advancement and retraction. Further, since the frame bodies are respectively attached to the respective molds, the stroke amount of the frame body (enclosure amount) can be restrained within a range a little larger than the radius of the parison. Accordingly, since the drive mechanism for actuating the frame body can be made simple, the arrangement of the parison shutter, and as a result, the arrangement of the blow-molding mold itself can be simplified, thus facilitating the production of the blow-molding mold.

In the blow-molding mold of the present invention, the blow-molding mold may preferably has a design mold having a die design surface and an opposing mold opposing the design mold, the parison shutter being advanceable and retractable from the opposing mold to the design mold, and the parison shutter having a frame body formed on a land portion around the design mold for the parison to be pressed.

According to the present invention, since the parison shutter is constructed by a simple frame provided on only one of the die, the number of the provided frame is one in contrast to providing both opposing molds with the frames, thereby reducing cost for producing the parison shutter and, in the end, the cost of the molding product.

When the blow-molding mold having the frame on one side, following blow-molding method may preferably used.

Specifically, the parison may be pressed against the land portion around the design mold, and, after or simultaneously with decompressing a closed space surrounded by an outer surface of the parison and the die design surface of the design mold, the design mold and the opposing mold may be closed.

According to the above arrangement, the parison can be securely pressed against the design surface, thus obtaining excellent moldability while simplifying the blow-molding die.

BRIEF DESCRIPTION OF DRAWINGS

FIG. 3 is a perspective view showing a blow-molding mold according to second embodiment of the present invention;

FIG. 4 is a cross section showing a frame clamping step of a blow-molding method according to the second embodiment of the present invention;

FIG. 5 is a cross section showing a mold clamping step of the blow-molding method according to the second embodiment of the present invention.

BEST MODE FOR CARRYING OUT THE INVENTION

[First Embodiment]

An embodiment of the present invention will be described below with reference to attached drawings.

Figure 1:
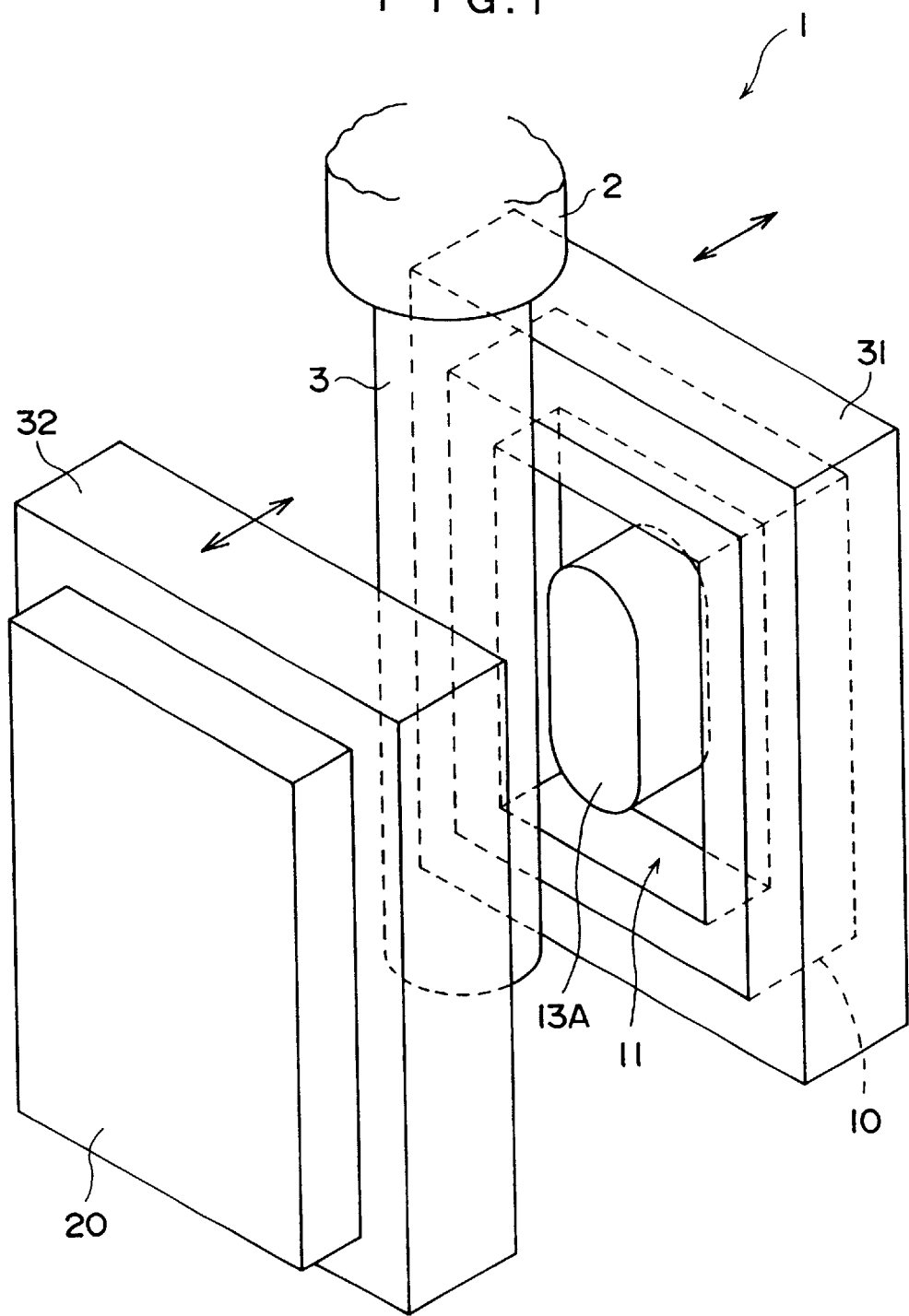
FIG. 1 is a perspective view showing a blow-molding mold and parison according to first embodiment of the present invention.

FIG. 1 shows a blow-molding mold 1 having frames 31 and 32 as a parison shutter of the present embodiment.

The blow-molding mold 1 accommodates a parison 3 fed downwardly from a die 2 provided thereabove to shape the parison 3, where a cavity corresponding to a molding product is formed thereinside when being clamped.

The die 2 extrudes a molten resin of plasticized resin downwardly from a ring-shaped discharge hole (not shown) to feed the cylindrical parison 3 to the blow-molding mold 1.

As shown in FIGS. 1 and 2, the blow-molding mold 1 has a first mold 10 and a second mold 20, and the frames 31 and 32 respectively attached to the molds 10 and 20. The first mold 10 and the second mold 20 are half-divided split molds, into which the parison 3 is extruded from the die 2 between the first and the second molds 10 and 20.

A die design surface 11 having a design and pattern on the outside of the blow-molded product and a land portion 12 other than the die design surface 11 to be an outer periphery of the die design surface 11 are provided on the inner surface of the first mold 10.

A convex portion 13 protruding toward the second mold 20 is provided on the die design surface 11 and a distal end surface of the convex portion 13 in the protrusion direction, i.e. the surface on the second mold 20 side, is a pre-contact portion 13A to be initially in contact with the parison 3 in clamping the mold.

The pre-contact portion 13A and a concave portion 14 are formed on the top and the bottom of the convex portion 13, the convex portion 13 and the concave portion 14 forming a complicated irregular configuration on the die design surface 11.

An discharge path 15 having one end opening to the concave portion 14 is formed on the first mold 10, the other end of the discharge path 15 extending toward the outside of the first mold 10 and being connected to an exhauster (such as a vacuum pump), so that the air in the closed space formed between the frames 31 and 32, the molds 10 and 20, and the parison 3 is sucked out.

The second mold 20 opposing the first mold 10 also has a die design surface 21 provided with design and pattern of a side of the blow-molded product and a land portion 22 to be in contact with the first mold 10.

As shown in FIG. 1, the frames 31 and 32 are attached to the first mold 10 and the second mold 20 respectively, and are formed in a metal square frame shape to cover the outer periphery of the respective molds 10 and 20.

An advancement and retraction mechanism such as an air cylinder is attached to the frames 31 and 32 to be movable toward and away from the opposing mold by air pressure or hydraulic pressure. When the advancement and retraction mechanism is actuated, after the respective frames 31 and 32 move closer with each other, the frames 31 and 32 are closed by bringing the opposing surfaces into contact with each other, thus forming a closed space 33 in the frames 31 and 32 isolated by the frames 31, 32 and the molds 10 and 20.

According to thus structured present embodiment, the molding product is molded according to following steps.

Figure 2A:
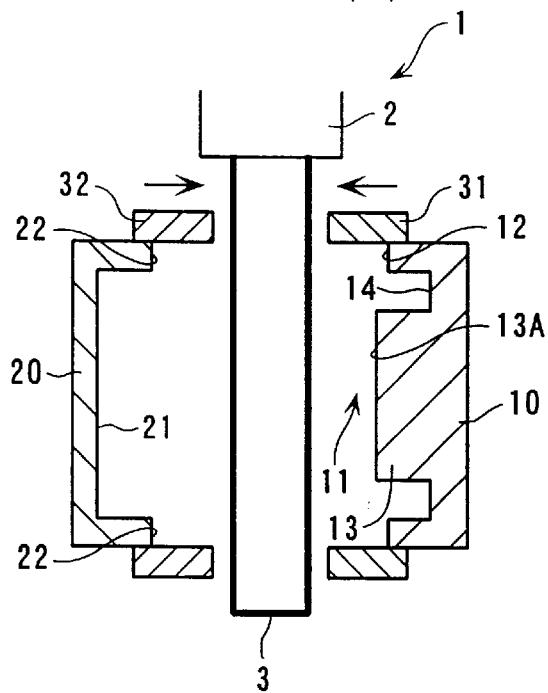
FIG. 2 is an illustration showing a blow-molding step according to the first embodiment of the present invention.

Initially, as shown in the parison injection step of FIG. 2(A), the first mold 10 and the second mold 20 are spaced apart and opened and, simultaneously, an injection pin (not shown) is retracted by the advancement and retraction mechanism to be sunk relative to the pre-contact portion 13A.

Subsequently, the molten resin is extruded downwardly from the discharge hole of the die 2 to introduce the cylindrical parison 3 into the space between the first mold 10 and the second mold 20.

Figure 2B:
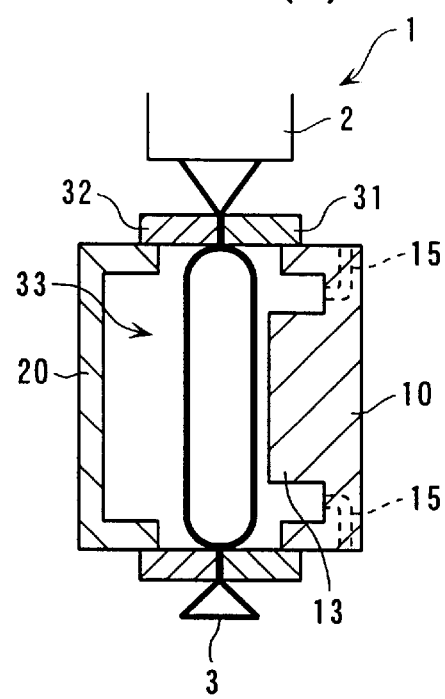

When the parison 3 is fed into the blow-molding mold 1, the opposing frames 31 and 32 are moved mutually closer by the advancement and retraction mechanism (not shown) as shown in the frame clamp step of FIG. 2(B). The upper end and the lower end of the parison 3 are pinched and the side space is isolated by the frames 31 and 32, so that the parison 3 is enclosed in the closed space 33 formed by the frames 31, 32 and the molds 10 and 20 while keeping the parison 3 away from the die design surface 11, 21 of both of the molds 10 and 20.

At this time, in order to adjust the air amount (air pressure) enclosed in the parison 3, pre-blowing may be conducted to feed air from a hole provided at the center of the die 2 until a predetermined air amount (air pressure) is secured in the parison 3.

Figure 2C:
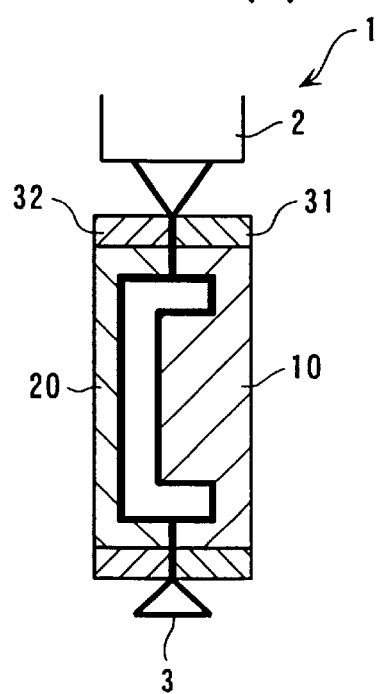

Thereafter, as shown in mold clamping step of FIG. 2(C), the blow-molding mold 1 is started to be clamped. Specifically, when the first mold 10 and the second mold 20 moves toward each other, the parison 3 is pressed by the respective molds 10 and 20, so that the air pressure in the parison 3 is raised to inflate the parison 3 toward the concave portion 14.

At this time, since the parison 3 is enclosed in the closed space 33 by the frames 31, 32, the air pressure inside the parison 3 is also raised in accordance with movement of the first mold 10 and the second mold 20 toward each other. Thus, the parison 3 continuously touches the concave portion 13A of the first mold 10 and the molding surface of the concave portion 14, so that the design and the pattern of the die design surfaces 11 and 21 of the first mold 10 and the second mold 20 are transferred onto the parison 3.

In some cases, the air existing inside the closed space 33 enclosed by the frames 31 and 32 may be discharged to the outside of the molds 10 and 20 through the discharge path 15 to increase pressure difference between the inside and the outside of the parison 3. In this case, the parison 3 can be securely in contact with the mold surface 11 and 21 without substantially increasing the air amount of the parison 3.

Alternatively, after bringing the parison into contact with the whole inner surface of the mold only by the internal pressure of the parison, additional blow may be conducted to the inside of the parison in order to avoid decrease in transferability on account of contraction of the resin caused by cooling.

Figure 2D:
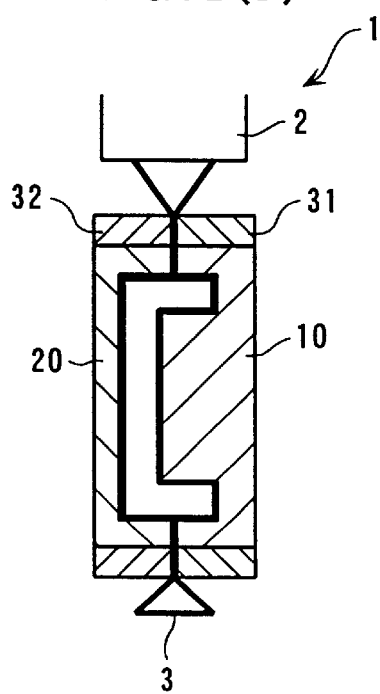
Figure 6A:
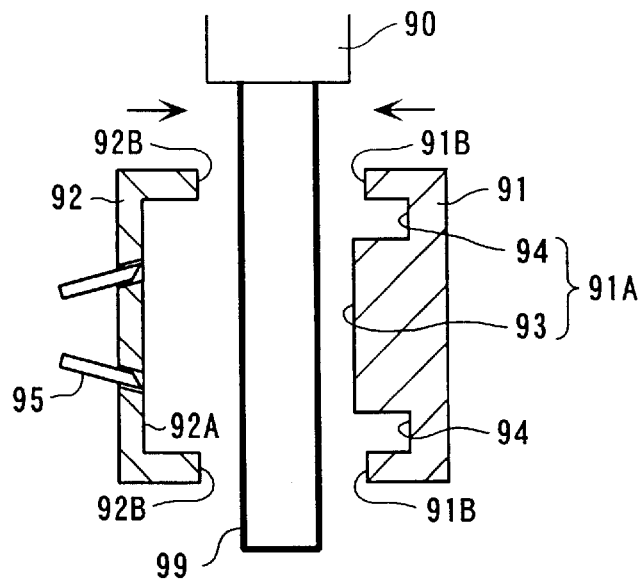
FIG. 6 is an illustration showing a blow-molding step of a conventional art.
Figure 6B:
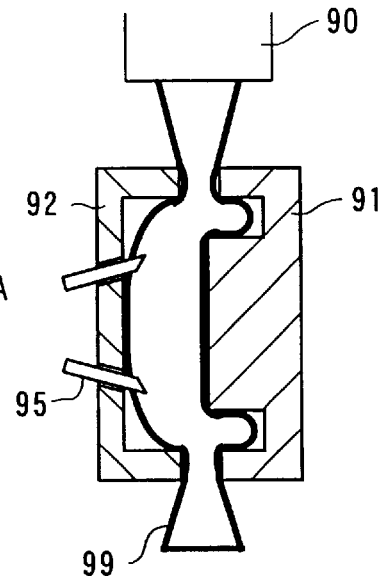
Figure 6C:
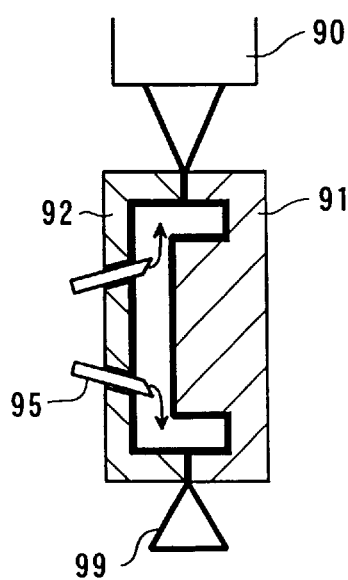
Figure 6D:
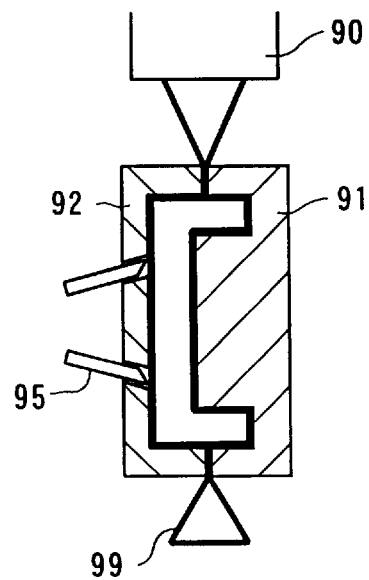

Finally, as shown in cooling step of FIG. 2(D), the production of the blow-molded product is completed by solidifying the parison 3.

Incidentally, during the cooling step, a temperature-control medium provided to the first mold 10 and the second mold 20 may be switched to a lower temperature to cool the first mold 10 and the second mold 20 rapidly, or alternatively, the molding product may be forcibly cooled from the inside thereof using an air chiller etc. Further alternatively, dry ice or cooled nitrogen gas may be injected therein to enhance cooling.

According to the present embodiment, following effect can be obtained.

[Effect 1]

Since the frames 31 and 32 shuts the parison 3 at the frame clamping step (B) before the mold clamping step (C), the closed space 33 for avoiding the parison 3 from inflating toward outside of the molds 10 and 20 can be formed by the frames 31, 32 and the molds 10 and 20. Accordingly, the parison 3 is enclosed in the closed space 33 and a predetermined amount of air is secured in the parison 3. When the mold is started to be clamped thereafter, since the parison 3 does not inflate toward the outside of the molds 10 and 20, simultaneously with the initial contact of the convex portion 13A of the first mold 10 with the parison 3, the pressure in the parison 3 starts increasing, so that the parison 3 can be continuously in contact with the concave portion 14 of the first mold 10 without intermittence. Accordingly, the parison is uniformly contracted by cooling, thus avoiding molding failure such as streaks, wrinkles and uneven pattern transfer, so that blow-molded products having surface with clear glossiness and transparency can be obtained.

[Effect 2]

An air feeder is inserted to the parison 3 before the frame clamping step (B) to blow gas (air) from the outside to the inside of the parison 3 (i.e. to pre-blow), so that an air pressure for causing sufficient force for the parison 3 to touch the die design surfaces 11, 21 is secured in the parison 3. Accordingly, the parison can be securely and uniformly in contact with the die design surface of the mold, so that the number of the failed molding product can be further reduced, thus improving production efficiency.

[Effect 3]

The discharge path 15 for discharging the gas (air) filled in the cavity during the mold clamping step (C) is provided to the first mold 10. Accordingly, since the air in the cavity can be discharged through the discharge path 15, the air pressure in the cavity (pressure of the gas) can be made negative. Therefore, the pressure difference between the inside and the outside of the parison 3 can be further enhanced as compared to only closing the frames 31 and 32. Accordingly, greater force for abutting the parison 3 against the die design surfaces 11 and 21 is generated, so that the complicated irregular configuration and minute pattern formed on the die design surfaces 11 and 21 can be transferred to the parison 3, thereby obtaining variety of molding product.

[Effect 4]

The frames 31 and 32 as the parison shutter is provided around the respective molds 10 and 20 with a predetermined advancement and retraction mechanism, so that the shutting movement of the frame 31 and 32 and the advancement and retraction movement of the molds 10 and 20 are independently conducted. Accordingly, the advancement and retraction mechanism and the frames 31 and 32 can be attached to the molds 10 and 20 without largely modifying the molds 10 and 20, thus facilitating production of the blow-molding mold 1.

[Second Embodiment]

FIGS. 3, 4 and 5 show a blow-molding mold 1A according second embodiment of the present invention.

Incidentally, identical reference numeral will be attached to components identical with or similar to the aforesaid embodiment to omit or simplify description thereof.

The difference between the blow-molding mold 1A of the second embodiment relative to the blow-molding mold 1 of the aforesaid first embodiment is that only one mold 50 of opposing molds 40 and 50 has a frame 60 that is pressed onto a land portion 42 of the mold 40 to hold the parison 3, thereby avoiding inflation of the parison 3 toward the outside of the molds 40 and 50.

Specifically, a die design surface 41 of the molding product and the land portion 42 provided on an outer periphery of the die design surface 41 are formed on an inner surface of the mold 40. On the other mold 50, the frame 60 formed by combining metal pipe in a square is held by an arm 61.

Incidentally, the frame 60 is disposed on the other mold 50 at a position opposing a land portion of the mold 40. As shown in FIG. 5, when the other mold 50 moves toward the mold 40, the frame 60 and the arm 61 are accommodated in a concave step portion 51 formed on a periphery of the other mold 50. The arm 61 is attached advanceable and retractable relative to the mold 50 by an air cylinder etc.

In the present embodiment, after the parison 3 is fed between the mold 40 and the mold 50, the frame 60 protrudes from the mold 50 toward the mold 40 and the mold 40 moves toward the mold 50, so that an upper end and the lower end of the parison 3 are pressed to the land portion 42 by the frame 60 and the land portion 42 of the mold 40, thus closing the frame 60 to avoid inflation of the parison 3 out of the space between the molds 40 and 50.

Incidentally, as in the first embodiment, when the air amount enclosed in the closed parison 3 is insufficient at the step of closing the frame 60, a pin-shaped air feeder extending from the bottom of the parison 3 can be provided to feed air into the parison 3 (i.e. to pre-blow) as in the same manner as the aforesaid first embodiment.

Further, when the parison 3 is enclosed by the frame 60, the space formed between the parison 3 and the die design surface 41 is arranged as a closed space and an opening as an end of the discharge path 15 is formed on the die design surface 41 of the mold 40 to suck the air in the closed space, thereby allowing a side of the enclosed parison 3 opposing the mold 40 to securely abut the die design surface 41.

In other words, since the parison 3 is enclosed by the frame 60, the air in the parison 3 cannot be leaked toward the outside, and the parison 3 itself cannot be inflated out of the molds 40 and 50. Accordingly, by discharging the air enclosed between the parison 3 and the die design surface 41 (cavity) to the outside through the discharge path 15 or by pre-blowing, the parison 3 can be sufficiently abutted to the die design surface 41. Accordingly, a predetermined pressure difference can be secured to the inside and the outside of the parison 3, thus securely abutting the die design surface of the mold 40.

According to the second embodiment, following effect can be obtained as well as effect 1 to 4 obtained in the first embodiment.

[Effect 5]

Since the frame 60 is provided only to the mold 50, the provision of the frame 60 can be reduced (single) as compared to providing the parison shutter on both opposing molds 40, the cost for manufacturing the frame as the parison shutter and, as a result, the cost of blow-molded product can be reduced.

Incidentally, the scope of the present embodiment is not restricted to the above embodiment but includes other arrangements as long as an object of the present invention can be attained, and the following modification can be included within the present invention.

Though the air is discharged toward the outside by pre-blowing using the air feeder and by discharging the air toward the outside through the discharge path 15 in the aforesaid first and the second embodiment in order to maintain a predetermined pressure difference between the inside and the outside of the parison 3, the pre-blow or the discharge of the air for negative pressure may be independently conducted, or the process may be conducted in combination. Further, such process may be omitted, and the discharge path 15 may be omitted in this case.

Further, though the frames 31, 32 and 60 are used as the parison shutter in the aforesaid first and the second embodiments, the arrangement is not limited. Any parison shutter may be used as long as the parison 3 extruded from the die can be isolated to form a closed space keeping the parison 3 therewithin. For instance, a device for pinching the parison 3 in right and left direction on the upper and the lower end of the parison 3 may be used.

The material of the molding products produced by the above blow-molding may be polypropylene (PP), polyethylene (PE), polystyrene (PS), acrylonitrile butadiene styrene resin (ABS), polycarbonate (PC), nylon and composition thereof.

The movement amount (stroke) for the frames 31, 32 and 60 to move toward with each other may be set at will within a range for the parison 3 not to touch the die design surface of the mold, which can be desirably set in accordance with the diameter of the die 2 and the type and characteristics of the material of the parison 3.

[Experiments]

Next, the effects of the present invention will be described below with reference to specific experiments.

In the present experiment, an automobile component was produced as a molding product by blow-molding according to the aforesaid embodiment.

Specific conditions such as presence of frame, stroke of the frame, air amount in the parison and mold temperature were set as in the below table to compare and examine the effect on the appearance of the molding product according to the provision of the frame.

TABLE 1

| | Embodiment 1 | Embodiment 2 | Embodiment 3 | Comparison 1 | Comparison 2 |
|---|---|---|---|---|---|
| Actuation of Frame | Yes | Yes | Yes | No | Yes |
| Contact of Parison with Design Mold surface during Frame Clamp Step and Frame Stroke Amount (Single Side; mm) | No 100 | No 100 | No 100 | — | Yes 20 |
| Air Amount in Parison | Sufficient | Sufficient | Sufficient | Sufficient | Sufficient |
| Mold temperature (° C.) | 40 | 80 | 130 | 130 | 130 |
| Presence of Streak Trace and Wrinkles | No | No | No | Generated (Prominent) | Generated |
| Presence of Uneven Transfer | No | No | No | Yes | Yes |

Incidentally, the section of air amount in the parison in the Table 1 shows a result of actual measurement of air pressure with the parison closed. The indication of "sufficient" air amount shows that the internal pressure of the parison was not less than 1.5 kgf/cm$^2$ when the mold clamping step was completed and the parison was in contact with the whole inner surface of the mold, where the parison was continuously abutted to the die design surface to obtain a molding product without streaks and wrinkles.

The resin used in the respective experiments and comparisons was polypropylene (grade name E-105GM, MT=0.5~0.6g/10 min., homo PP resin).

[Comparison 1]

Initially, in the comparison 1, the parison was closed by the mold clamping step without using the frame as in the conventional art and the parison was shaped while keeping the high mold temperature. As a result, since the parison touched the blow-up portion a little after being in contact with the pre-contact portion, the streaks and wrinkles as well as uneven pattern transfer were prominently generated to the blow-molded products obtained by shaping the parison, thus causing molding failure.

[Comparison 2]

In the comparison 2, after sufficiently securing the air amount enclosed in the parison, the parison was shaped with the frame stroke of 20 mm which was smaller than the stroke amount of 100 mm in the experiments 1, 2 and 3 and comparisons 1 and 3. Incidentally, the mold temperature was kept high at 130° C. As a result, since the distance between the molds were smaller than the diameter of the parison when the frame was closed, the parison touched the die design surface of the mold during the frame clamping step before the mold clamping step. Accordingly, the streaks, the wrinkles and uneven transfer occurred even when the air pressure in the parison was sufficiently secured and the sufficiently high mold temperature was maintained, thus causing molding failure.

[Experiments 1–3]

However, in the Experiments 1, 2 and 3 shown in the Table 1, while the parison was closed using the frame to keep the pressure difference between the inside and the outside of the parison, the mold was clamped with various mold temperature to shape the parison. As a result, even when the parison was shaped while changing the mold temperature, the parison shut by the frame did not inflate out of the frame and a force for the parison to touch the die design surface could be obtained, so that a molding product having good appearance without streaks, wrinkles of parison and uneven pattern transfer could be obtained.

Accordingly, it was confirmed that, after providing the frame (parison shutter) for shutting the parison prior to the mold clamping step and the frame shut the parison to avoid contact of the parison against the die design surface of the mold, the mold was necessary to be clamped while securing a predetermined amount of air in the enclosed parison in order to obtain the molding product having good appearance.

Industrial Availability

The present invention relates to a blow-molding method for molding a molding product by introducing a parison extruded from a die into a mold and clamping the parison, a blow-molded product obtained by the blow-molding method and a blow-molding mold used for the blow-molding method, which can be preferably used for molding resin containers such as bottle and tank, automobile components such as a bumper and a spoiler, a housing facilities such as door panel and components for bath and lavatory units, and building material such as table top and various panels.

What is claimed is:

1. A blow-molding method for molding a molding product by introducing a parison extruded from a die into a mold, the method comprising the steps of:

providing the mold with a parison shutter for shutting the parison to keep the parison from inflating out of the mold;

opening the mold;

introducing the parison into the mold;

shutting the parison by the parison shutter without bringing the parison into contact with the inner surface of the mold; and closing the mold to compress the parison to bring the parison into contact with the inner surface of the mold.

2. The blow-molding method according to claim 1, further comprising the step of pre-blowing for blowing air into the parison before shutting the parison by the parison shutter.

3. The blow-molding method according to claim 1, wherein, when the parison is shut by the parison shutter, a space surrounded by an outer surface of the parison and an inner surface of the mold is arranged as a closed space and the mold is closed after decompressing the closed space.

4. The blow-molding method according to claim 1, wherein, after the parison is taken out from the inside of the mold, the surface is either transparently coated or not coated.

5. A blow-molded product molded by the blow-molding method according to claim 1.

6. A blow-molding mold for accommodating and blow-molding a parison extruded from a die, comprising:

a parison shutter for shutting the parison extruded from the die to keep the parison from inflating out of the mold, the parison shutter comprising a frame body respectively provided around a periphery of opposing molds and advanceable and retractable from one mold to the other mold, the frame body being abutted to shut the parison within a closed space isolated from an outside of the mold by the frame body and the mold.

7. A blow-molding mold for accommodating and blow-molding a parison extruded from a die, comprising:

a parison shutter for shutting the parison extruded from the die to keep the parison from inflating out of the mold, and a design mold having a die design surface and an opposing mold opposing the design mold, wherein the parison shutter is advanceable and retractable from the opposing mold to the design mold, the parison shutter having a frame body formed on a land portion around the design mold for the parison to be pressed.

8. A blow-molding method using the mold of claim 7, comprising the steps of:

pressing the parison against the land portion around the design mold;

after or simultaneously with decompressing a closed space surrounded by an outer surface of the parison and the die design surface of the design mold, closing the design mold and the opposing mold.

* * * * *